United States Patent
Lionello et al.

(10) Patent No.: US 10,740,580 B2
(45) Date of Patent: Aug. 11, 2020

(54) MULTI-FUNCTION SOUND CHAMBER FOR HANDHELD BARCODE READER

(71) Applicant: Datalogic IP Tech S.R.L., Calderara Di Reno, Bologna (IT)

(72) Inventors: Giacomo Lionello, Bologna (IT); Giuseppe Di Bari, Bologna (IT)

(73) Assignee: Datalogic IP Tech S.R.L., Calderara di Reno, Bologna (IT)

(*) Notice: Subject to any disclaimer, the term of this patent is extended or adjusted under 35 U.S.C. 154(b) by 0 days.

(21) Appl. No.: 16/146,935

(22) Filed: Sep. 28, 2018

(65) Prior Publication Data
US 2020/0104557 A1    Apr. 2, 2020

(51) Int. Cl.
*G06K 7/10* (2006.01)
*G10K 11/02* (2006.01)
*G06K 19/077* (2006.01)

(52) U.S. Cl.
CPC ..... *G06K 7/10881* (2013.01); *G06K 7/10732* (2013.01); *G06K 19/07711* (2013.01); *G10K 11/025* (2013.01)

(58) Field of Classification Search
CPC .......... G06K 7/10376; G06K 7/10386; G06K 7/10772; G06K 9/22
(Continued)

(56) References Cited

U.S. PATENT DOCUMENTS 5,410,141 A * 4/1995 Koenck ................ B60R 11/02
                                                235/472.02
5,416,463 A   5/1995 Higgins, Jr. et al.
(Continued)

FOREIGN PATENT DOCUMENTS

CN    201204253 Y    3/2009
CN    201657060 U    11/2010
(Continued)

OTHER PUBLICATIONS

Bjorn Kolbrek, "Horn Theory: An Introduction, Part 1," audioXpress, https://www.grc.com/acoustics/an-introduction-to-horn-theory.pdf, 2008, 9 pages.
(Continued)

*Primary Examiner* — Daniel St. Cyr
(74) *Attorney, Agent, or Firm* — Foley & Lardner LLP (57) ABSTRACT

A multi-function sound chamber for a handheld barcode reader may include the ability to (i) amplify or otherwise efficiently project an audible signal generated by a buzzer of the barcode reader to sound window(s), and (ii) provide stiffening support to a printed circuit board (PCB) on which an electromechanical switch is mounted that a trigger of the handheld barcode reader engages when activated by a user of the reader. The sound chamber may provide other functions, including isolating light between good/bad read signals and battery level status. Another function may include reducing electrostatic discharge (ESD) by providing a high-impedance seal around connecting screws. Another function may include retention of the PCB by providing a pocket with a compliant material to retain a top or other edge of the PCB. By having the sound chamber perform multiple functions, the barcode reader may be produced more efficiently and cost effectively.

27 Claims, 8 Drawing Sheets

(58) Field of Classification Search
USPC ............ 235/472.01, 462.45, 462.46, 472.02
See application file for complete search history.

(56) References Cited

U.S. PATENT DOCUMENTS

| | | | |
|---|---|---|---|
| 5,930,376 | A | 7/1999 | Markow et al. |
| 6,597,794 | B2 | 7/2003 | Cole et al. |
| 7,139,395 | B2 | 11/2006 | Sung |
| 7,627,112 | B2 | 12/2009 | Sung |
| 9,300,769 | B2 | 3/2016 | Barkan et al. |
| 2002/0005950 | A1* | 1/2002 | Beimers ............ G01J 3/02 356/402 |
| 2004/0134990 | A1* | 7/2004 | Fitch .............. G06K 7/10881 235/472.01 |
| 2009/0188970 | A1* | 7/2009 | Gouelibo ............ G06K 19/086 235/375 |
| 2011/0290889 | A1* | 12/2011 | Tamburrini ........ G06K 7/10881 235/470 |
| 2014/0105425 | A1 | 4/2014 | Chu et al. |
| 2016/0188930 | A1* | 6/2016 | Zumsteg ............ G06K 7/10366 235/451 |

FOREIGN PATENT DOCUMENTS

| | | |
|---|---|---|
| CN | 10234802 A | 2/2012 |
| CN | 20923027 U | 1/2018 |
| WO | 2012048496 A1 | 4/2012 |

OTHER PUBLICATIONS

Bjorn Kilbrek, "Horn Theory: An Introduction, Part 2," audioXpress, audioXpress, https://www.grc.com/acoustics/an-introduction-to-horn-theory.pdf, 2008, 9 pages.

Zebra DS4308-HC, "Protect Patent health with Next Generation Bar Code Scanning" Zebra Technologies, ZIH Corp., Apr. 2015, 8 pages.

Motorola Symbol DS4308-HC Scanner, https://www.barcodesinc.com/motorola/ds4308-hc.htm?aw$adpos=1t3&i=1&gclid=EAlaI . . . . Aug. 14, 2018, 2 pages.

* cited by examiner

MULTI-FUNCTION SOUND CHAMBER FOR HANDHELD BARCODE READER

BACKGROUND

Barcode readers or code readers are used in many different ways for commercial purposes. There are many different styles of code readers, including a handheld gun that includes a trigger for reading machine-readable indicia, such as barcodes, QR codes, and other machine-readable indicia. Code readers are often used to read machine-readable indicia to count inventory or perform other functions, such as performing checkouts at a retail store. To notify a user that the machine-readable indicia has been decoded correctly or incorrectly, a sound or audible signal, such as a buzzer, is generated to audibly notify the user that the machine-readable was successfully or unsuccessfully decoded.

Because barcode readers are often used in noisy environments, such as retail stores, factories, warehouses, etc., the audible signal is to have a volume that is loud enough for the user to hear. To accommodate such environments, a code reader requirement is to be capable of generating an audible signal with an audible signal level above a minimum threshold level, such as a sound pressure level (SPL) of 70 dBA measured at 50 cm for a "retail" environment code reader, and 80 dBA measured at 50 cm for an "industrial" environment code reader. Meeting the minimum audible signal threshold level using conventional buzzers of barcode readers can be a challenge. Adding to the challenge is the fact that handheld barcode readers can be expensive to assemble due to the number of parts that have to be included within a housing of the handheld barcode readers, so the ability to add complexity and parts within handheld code readers is limited. Sound chambers are sometimes used to help improve sound directivity, which is an index that measures how focused a sound wave is in one major direction. As understood in the art, the more directivity a sound has, the less that sound has energy in other directions, thereby lowering the distance at which the sound is audible in those other directions. However, the use of sound chambers in handheld code scanners can be challenging due to size constraints. Accordingly, there is a need to increase audible signals of code readers to achieve the minimum audible signal threshold level, size constraints, production efficiencies, and cost constraints.

SUMMARY

A multi-function sound chamber for a handheld barcode reader or code reader may include the ability to (i) amplify or otherwise efficiently project an audible signal generated by a buzzer of the barcode reader to sound window(s), and (ii) to provide stiffening support to a printed circuit board (PCB) on which an electromechanical switch is mounted that a trigger of the handheld barcode reader engages when activated (e.g., pulled) by a user of the barcode reader. In an embodiment, the sound chamber may provide a third function to be configured as a light guide for either or both (i) illumination of read notification good/bad signals and (ii) battery level status, and to reduce or eliminate cross-output of the respective lights. Another function provided by the sound chamber may include reducing electrostatic discharge (ESD) by providing a high-impedance (e.g., rubber) seal around connecting screws of the sound chamber within the barcode reader. Another function that the sound chamber may perform is that of a retaining member by providing a pocket with a rubber or other compliant material to retain a top or other edge of the PCB, thereby securing the PCB within the housing of the code reader. By having the sound chamber perform multiple functions, the barcode reader may be produced more efficiently and cost effectively.

One embodiment may include a handheld barcode reader that includes a housing including a (i) handle, (ii) at least one sound window defined by the housing that faces a user of the reader when operating the reader, and (iii) a reading window through which machine-readable indicia are read. An electronic reading device may be configured to image machine-readable indicia, and to generate image data indicative of the machine-readable indicia. A trigger may extend from the handle that enables a user to engage the trigger to activate the electronic reading device to read a machine-readable indicia. A printed circuit board (PCB) may include (i) electronics configured to decode the image data, and (ii) an electromechanical switch attached thereto, where the trigger may be aligned relative to the electromechanical switch such that when the user transitions the trigger from a first position to a second position, the trigger contacts the electromechanical switch. The electronics of the PCB may also be configured to perform various functions of the code reader, including power management, data communications (e.g., wired and wireless), and so on. An audible output component may be in communication with the electronics, and be configured to output an audible signal in response to the electronics successfully or unsuccessfully reading and decoding the machine-readable indicia. A sound chamber may be configured to be positioned within the handle of the housing, and be configured to (i) propagate the audible signal from the audible output component to the sound window(s), and (ii) operate as a stiffening member for the printed circuit board by being disposed between and pressing against the housing and the printed circuit board.

One embodiment of a method of assembling a handheld barcode reader may include providing a housing including a (i) handle, (ii) at least one sound window defined by the housing, and (iii) a reading window through which machine-readable indicia are read. A trigger to extend from the handle that enables a user to engage the trigger to cause the barcode reader to read a machine-readable indicia may be provided. A printed circuit board (PCB) including (i) electronics configured to decode the image data, and (ii) an electromechanical switch attached thereto may be provided. The trigger may be aligned relative to the electromechanical switch such that the trigger contacts the electromechanical switch when the trigger is transitioned from a first position to a second position. A sound chamber may be positioned within the handle of the housing to enable an audible signal output from the audible output component to the sound window(s), and to stiffen the printed circuit board by being disposed between and pressing against the housing and printed circuit board.

One embodiment of a multi-function sound chamber may include a structure defining a sound guide, and dimensioned to fit within a space defined by (i) a housing of a handle and a reader head of a handheld barcode reader, the housing defining at least one sound window, and the sound guide aligned with the at least one sound window to guide sound generated by an audio signal generator to the sound window(s), and (ii) a printed circuit board disposed (PCB) within the housing and vertically oriented within the handle with electronics mounted to the PCB facing forward or backward relative to a reading window of the handheld barcode reader, the dimensions of the structure causing the structure to press against an inside surface of the housing and a surface of the PCB such that the PCB is pushed forward.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
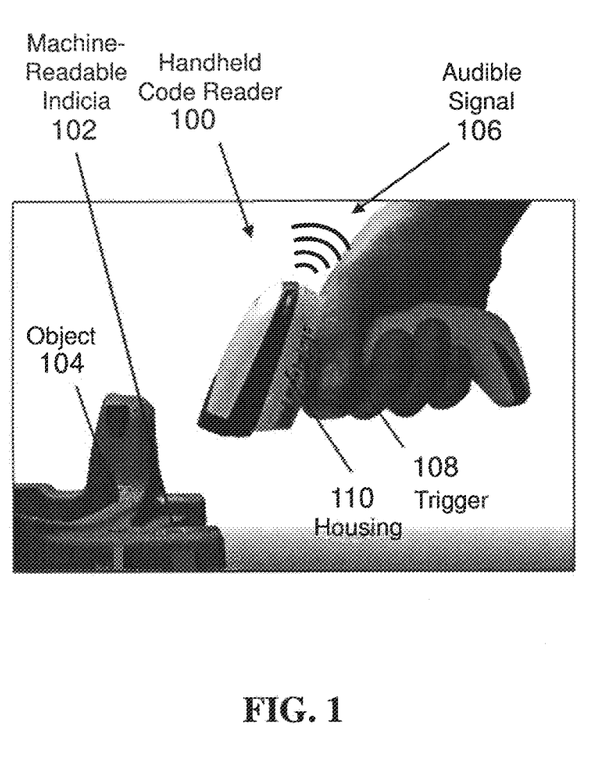
FIG. 1 is an illustration of an illustrative handheld code reader configured to read and decode machine-readable indicia (e.g., barcodes, QR codes, etc.), and to produce an audible signal that meets a minimum audible threshold level.

With regard to FIG. 1, an illustration of an illustrative handheld code reader 100 configured to read and decode machine-readable indicia 102, such as barcodes, QR codes, direct part (DP) markings, etc., disposed on an object 104, and produce an audible signal 106 that meets a minimum audible threshold level is shown. As an example, one product requirement or specification is for the audible signal 106 to be at least a total sound pressure level (SPL) of 70 dBA measured at 50 cm from the handheld code reader 100 using a conventional buzzer with maximum electrical power used by code readers. As has been tested, without a sound chamber, audible signals were able to reach an SPL slightly below the minimum threshold target (e.g., 67-69 dBA), thus the use of the sound chamber enables the handheld code reader 100 to reach the minimum audible threshold level. Battery limitations in a wireless version and the necessity to use the same solution in a corded version (to maximize the reuse of the same components in different versions of barcode readers) provide for more efficient manufacturing processes. Still yet, power management in existing devices is a complex matter, which is exemplified by battery versus corded versions of handheld code readers, but USB configurations also have a limited amount of power for use in delivering audible tones.

As will be presented further herein, as a user pulls a trigger 108 to activate the handheld code reader 100 to read and decode the machine-readable indicia 102, the trigger 108 presses against an electromechanical switch that is mounted to a printed circuit board (PCB) (not shown) within a housing 110 of the handheld barcode reader 100. To help ensure quality and durability of the handheld code reader 100, the sound chamber may provide stiffness to the PCB so that bending or deflection of the PCB is limited in response to the trigger 108 being pulled against the electromechanical switch, thereby providing a more consistent feel of the trigger and durability of the barcode reader 100.

With regard to FIGS. 2A-2E, illustrations of an illustrative handheld code reader 200 inclusive of a multi-function sound chamber (see FIGS. 3A-3D) to functionally support various features, as described herein, are shown. The handheld code reader 200 includes a reader head 202 on which a reader window 204 is positioned to enable optical components (not shown) including an electronic reading device 205 within the reader head 202 to read machine-readable indicia (e.g., barcodes), as understood in the art. The electronic reading device 205 may include a light sensor and/or image sensor, and be one-dimensional (1D) or two-dimensional (2D). The optical components may include lens(es), mirrors, and/or any other optical components used for reading machine-readable indicia. The handheld code reader 200 may include a handle 206 that the user may grip when using the code reader 200, and a trigger 208 extending forward from the handle 206 that the user may pull to activate the reader 200 to image or scan machine-readable indicia positioned on objects or otherwise via the reader window 204. A housing 209 may extend around the handheld code reader 200 to house electronics, optics, electro-optics, electromechanical, and/or mechanical components contained therein. The housing 209 may be formed of any material, but is generally formed of a rigid plastic to provide protection for the components within the housing 209. In an embodiment, the housing 209 may define an enclosure that protects inner parts, and may be configured to include a handle, foot, top cover, and window(s). That is, the housing 209 may be shaped to fit around the reader head 202 and handle 206, individually or collectively, and define the various windows (e.g., reading window, sound window(s), and light window(s)), as previously described.

Figure 2A:
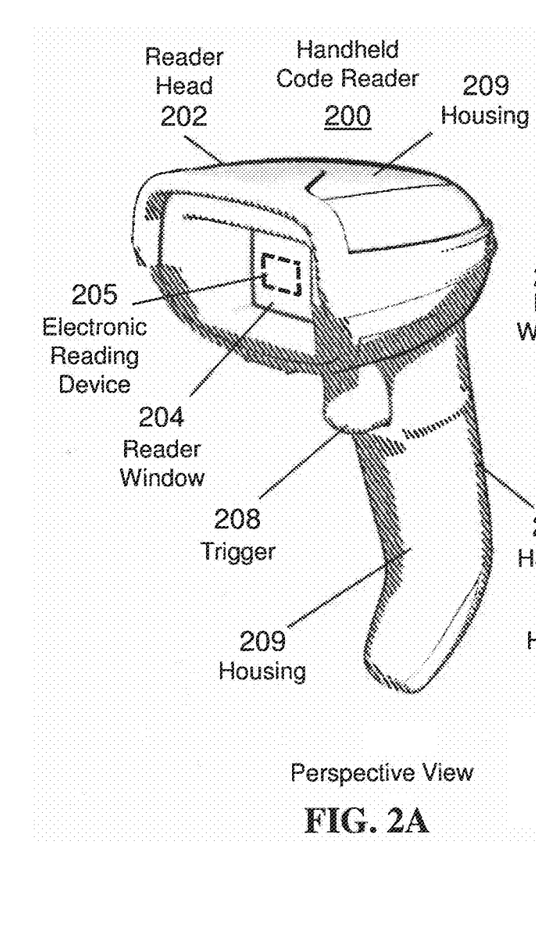
FIGS. 2A-2E are illustrations of an illustrative handheld barcode reader including sound windows, trigger, and light windows for good/bad readings and/or battery level as functionally supported by a multi-function sound chamber, as described herein.
Figures 2B, 2C:
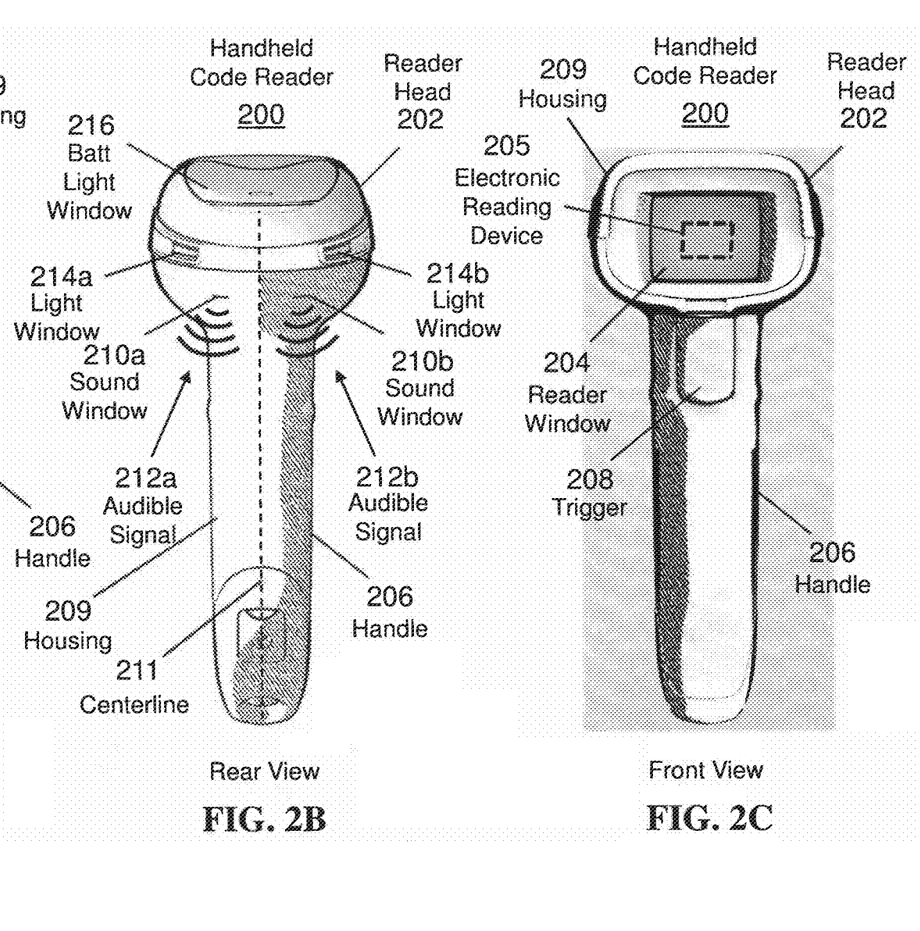

With regard to FIG. 2B, the handheld code reader 200 is shown to include multiple sound windows 210a and 210b (collectively 210) positioned on opposite sides of a vertical centerline 211 of the code reader 200 such that a user who is operating the code reader 200 is able to better hear audible signals 212a and 212b (collectively 212) from respective sound windows 210 irrespective of which hand the user is holding the code reader 200. Within the code reader 200, a sound chamber (see FIGS. 3A-3D) that includes sound paths that extend to each of the sound windows 210 may be included. Although two sound windows 210 are shown, it should be understood that one or more than two sound windows may be defined by the housing 209, and the sound chamber contained within the housing 209 may have sound paths that direct sound to each of the one or more sound windows.

Also defined by the housing 209 are light windows 214a and 214b (collectively 214) that may be used to output light or illumination signals that are indicative of the code reader 200 successfully or unsuccessfully reading and decoding a machine-readable indicia. In an embodiment, illumination signals, such as green and red, may be output from the light windows 214 to indicate successful and unsuccessful reading of a machine-readable indicia. A battery light window 216 defined by a top portion of the housing on the reader head 202 of the code reader 200 may enable an illumination signal indicative of an amount of power remaining in a battery (not shown) within the handheld code reader 200 to be projected to notify a user of battery status (e.g., power level of the battery). The illumination signal indicative of an amount of remaining power may be continuously on or selectively turned on by a user, for example. To avoid light meant to exit the light windows 214 from exiting the light window 216, the sound chamber may have light paths that block light meant to exit the respective light windows 214 and 216 from exiting the other window(s), as further described herein.

With regard to FIG. 2C, a front view illustration of the code reader 200 showing the reader window 204 defined by the housing 209 and trigger 208 that extends from a front side of the handle 206 is shown. In an embodiment, the housing 209 may be formed of a hard plastic or other rigid material that is not easily bent, thereby providing for a durable code reader 200.

Figure 2D:
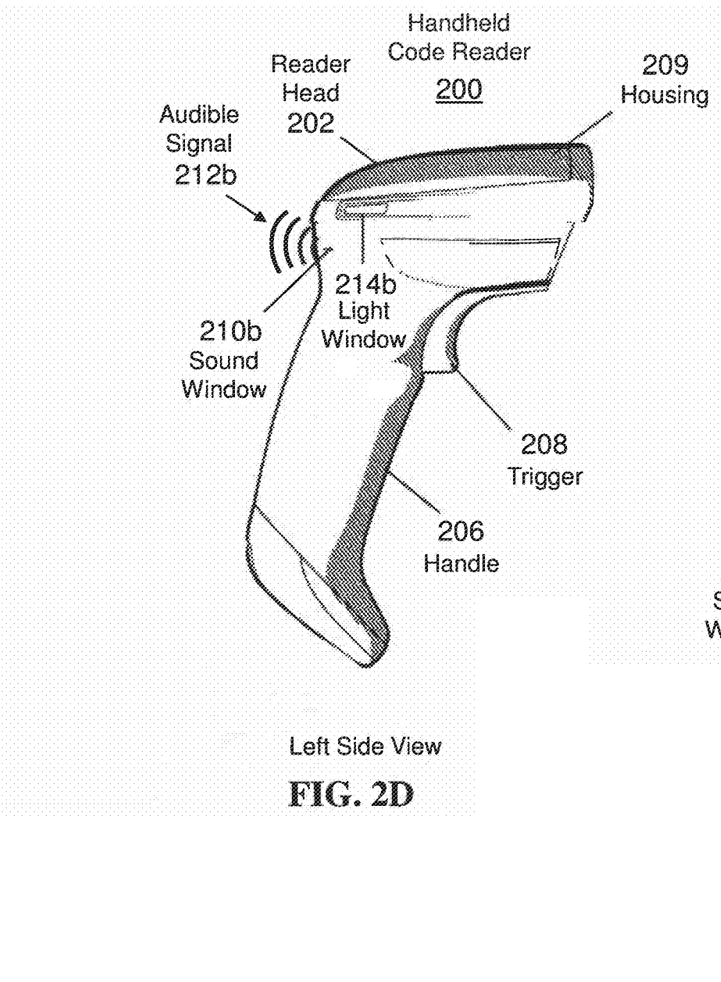

With regard to FIG. 2D, a left side view illustration of the code reader 200 showing the reader head 202 with the housing 209 that defines the sound window 210b and the light window 214b is shown. The trigger 208 is shown to extend from a front side of the handle 206. In the event that a user is operating the reader 200 to the left of his or her head, the user is able to see the light window 214b and hear the audible signal 212b.

Figure 2E:
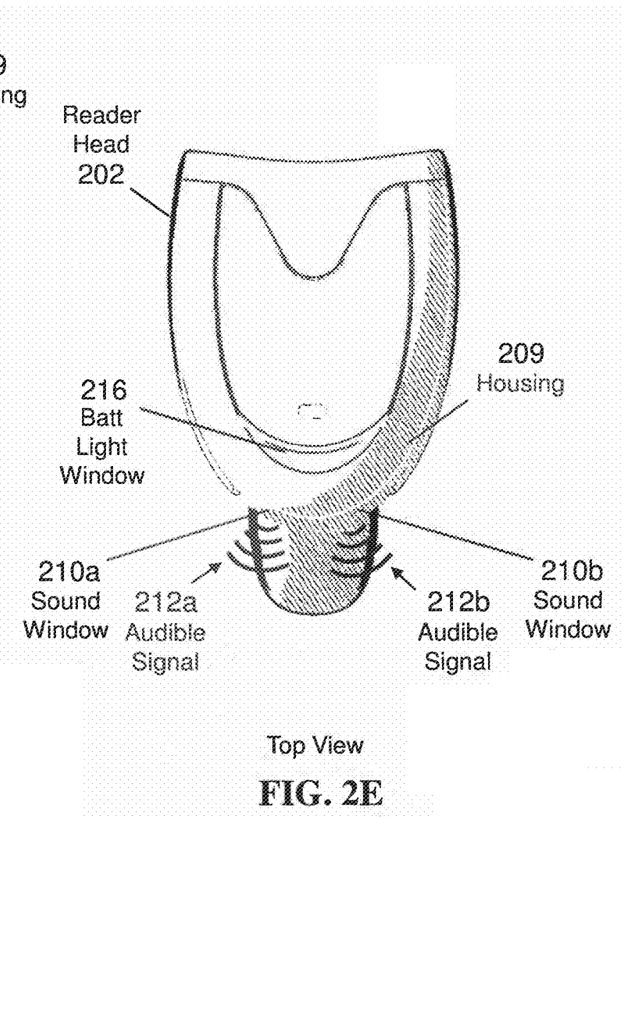

With regard to FIG. 2E, a top view illustration of the code reader 200 including the reader head 202 with the housing 209 that defines the sound windows 210 and the light windows 214 is shown. Audible signals 212 are shown to be propagating from the sound windows 210. The battery light window 216 is able to be seen to inform the user of remaining battery power, and light via the window 216 may be displayed in different colors (e.g., green, yellow, red) depending on the remaining power level.

With regard to FIGS. 3A-3D, mechanical schematics of an illustrative handheld barcode reader 300 showing an arrangement of an illustrative multi-function sound chamber 302 contained within a housing or bezel 304, as described herein, are shown. The sound chamber 302 may have a double horn shape, and include sound guides 303, where the sound guides 303 shown extend upwards and outwards, as further shown in FIGS. 4B and 4C. The sound chamber 302 may be thick or wide enough to be pressed firmly against an inside wall of the housing 304 and pressed firmly against a printed circuit board (PCB) 306 so as to push the PCB 306 forward, thereby functioning as a stiffening member for the PCB 306. By pushing the PCB 306 forward, alignment accuracy of the PCB 306 relative to internal ribs or guides that hold the PCB 306 in place is minimized as the PCB 306 being pushed forward results in repeatability of position when using the reader 300, as further described herein. In an embodiment, the sound chamber 302 may have a shell that is formed of a silicon rubber or other compressible material so as to reduce or eliminate hard materials from contacting one another that could cause rattling and/or other slippage between the two components.

Figure 3A:
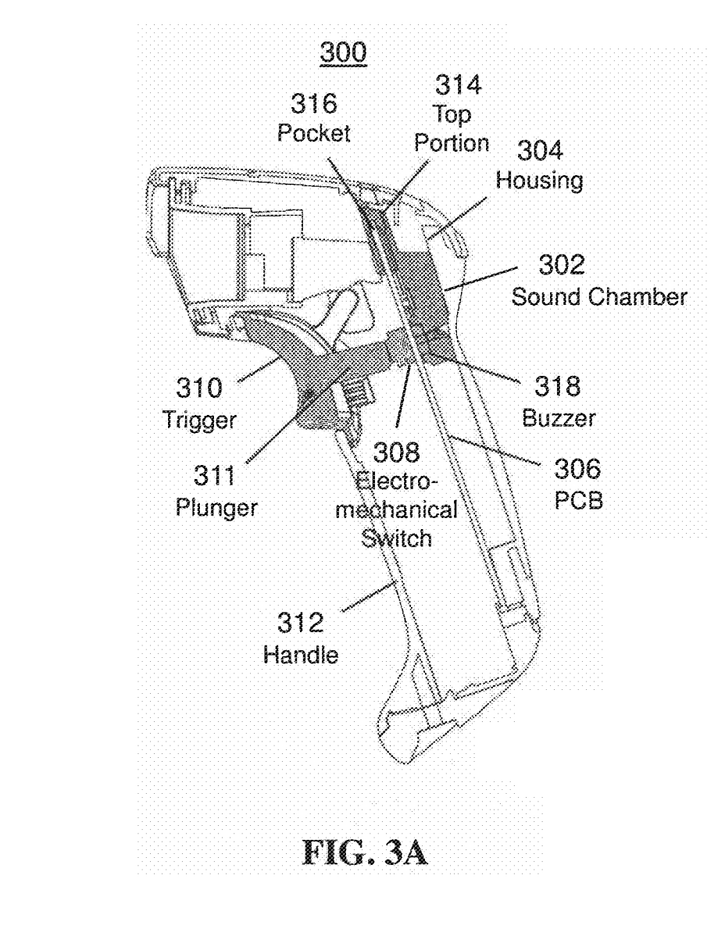
FIGS. 3A-3D are mechanical schematics of an illustrative handheld barcode reader showing an arrangement of an illustrative multi-function sound chamber, as described herein.

An electromechanical switch 308, which may be a surface mount technology (SMT) switch, may be mounted to the PCB 306 on which other electronics (not shown) may be disposed so that electrical signals from the switch 308 may be communicated to other electrical components. For example, trigger signals may be communicated to a processor that triggers a sensor and/or other electro-optical devices (e.g., LED for scanning or illumination for imaging) to scan or capture an image of a machine-readable indicia. As a result of the sound chamber 302 functioning as a stiffening member for the PCB 306, when a user pulls on a trigger 310 with a plunger 311 to engage and push against the electromechanical switch 308, the PCB 306 does not flex and either become damaged or cause the action of the trigger 310 feel "soft" to the user. Additionally, pushing the PCB 306 forward also improves control of the trigger 310 by providing a stable position of the switch 308 relative to the plunger 311.

The sound chamber 302 may be configured with a top or upper portion 314 that defines a pocket 316 through which the PCB 306 may be positioned and be secured when in an operating position. The top portion 314 may be formed of rubber or other elastic material, which may be the same material as part of the sound chamber so as to reduce the need for an alignment with the PCB 306 with high precision. In an embodiment, the top portion 314 may have a rubber coating or member that contacts the PCB 306 when in position so that the PCB 306 is held by flexible material as opposed to being held by rigid plastic material. Alternatively, the top portion 314 is formed of rubber, and is part of, engages, or contacts the sound chamber 302.

Figure 3B:
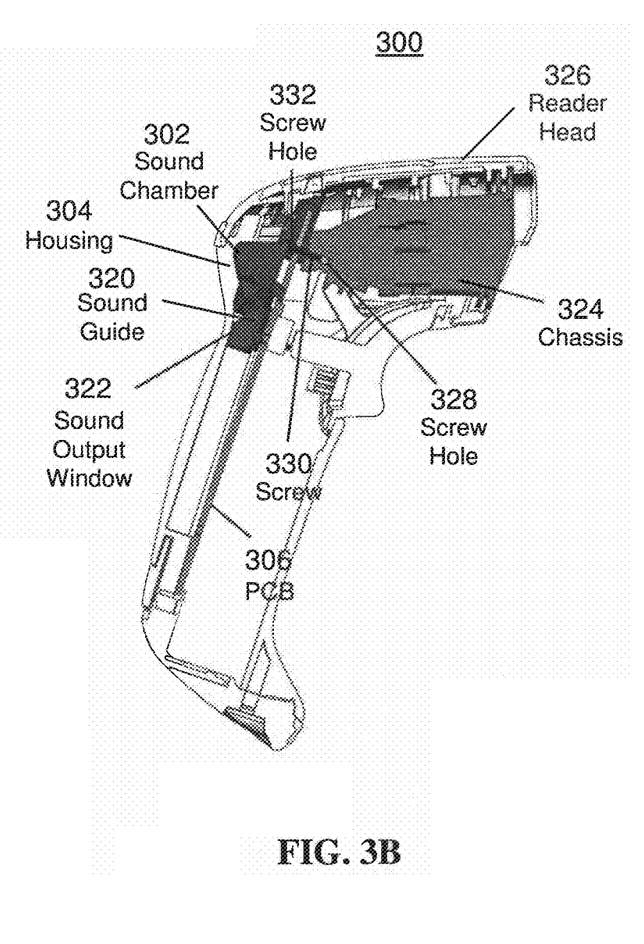

As shown in FIG. 3B, the sound chamber 302 includes a sound guide 320 through which sound is directed or routed to be output to a sound output window 322 at an end region of the sound guide 320 that is aligned with a sound window, such as sound window 210a of FIG. 2A, defined by the housing 304. As previously described, if multiple sound windows are defined by the housing 304, the sound guide 320 may form paths that extend to each one. As shown, the sound chamber 302 presses against both the housing 304 on one side and PCB 306 on the other side, thereby providing a stiffening support function to the PCB 306, as previously described. A chassis 324 within a reader head 326 may define a screw hole 328 for a screw 330 to extend through a screw hole 332 defined by the sound chamber 302 and aligned with the screw hole 328, thereby securing the sound chamber 302 to the chassis 324. It should be understood that additional screws and screw holes may be disposed in the chassis 324 and sound guide 320 to further secure the sound guide 320 to the chassis 324. The PCB 306 may also include screw hole(s) through which the screw 330 extends.

Figure 3C:
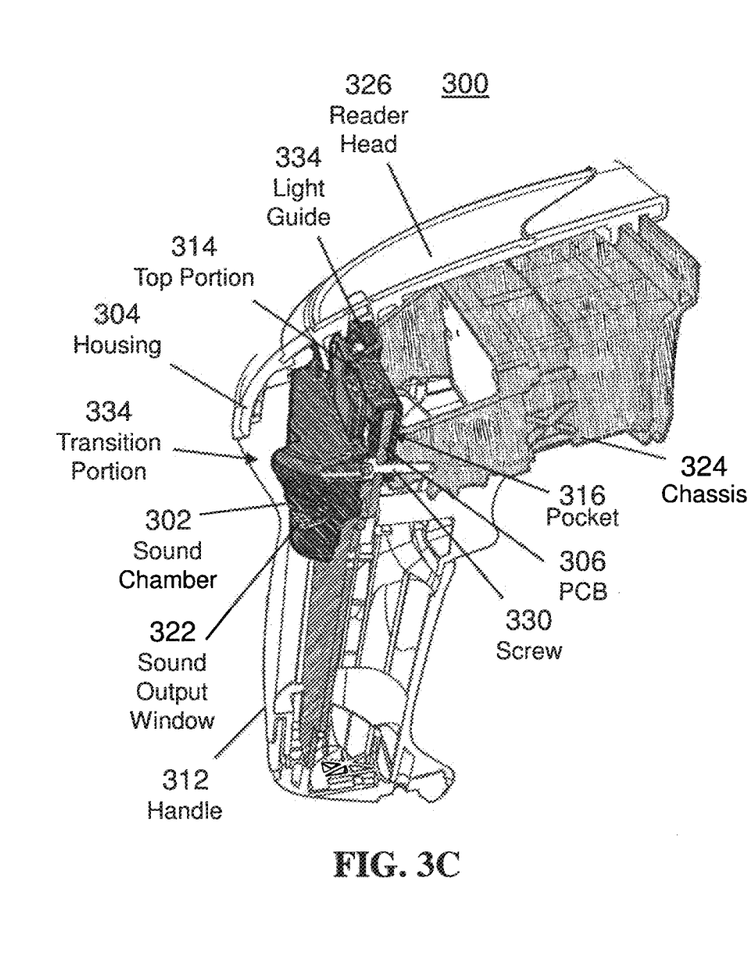

With regard to FIG. 3C, the sound chamber 302 is shown to be positioned within the housing 304 at a transition portion 334 between the handle 312 and reader head 326. The top portion 314 of the sound chamber 302 defines the pocket 316 that loops over a top edge of the PCB 306 to hold the PCB 306 in place. In an embodiment, rubber or other pliable material may be disposed on an inside portion of the top portion 314 so as to absorb motion of the PCB 306 and to prevent rattling. The screw 330 is shown to extend through the PCB 306 and into the chassis 324.

Figure 3D:
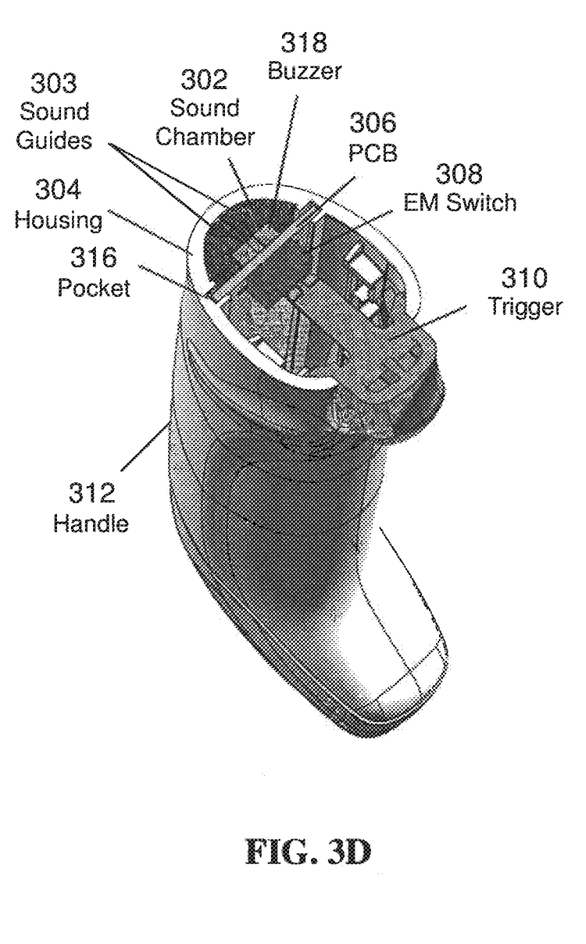

As shown in FIG. 3D, the handle 312 is shown with the sound chamber 302 pressing against the housing 304 and PCB 306 such that the PCB 306 is pressed forward to counteract the trigger 310 pressing against the electromechanical switch 308, thereby functioning as a stiffening member. As the sound chamber 302 functions as (i) a sound path, (ii) a stiffening member for the PCB 310, (iii) a holding member for the PCB 310, (iv) a light guide to block between the successful/unsuccessful reading light and battery indicator light from being output from the other windows, and (v) an electrostatic discharge preventer, as described with regard to FIG. 4B, the complexity and cost of the barcode reader 300 may be significantly reduced as a single device (i.e., the sound chamber 302) is capable of performing multiple functions, which reduces a total number of parts within the housing of the code reader 300.

With regard to FIGS. 4A-4E, mechanical schematics of an internal portion of an illustrative handheld barcode reader showing an arrangement of an illustrative multi-function sound chamber 402, as described herein, are shown. A trigger 404 is shown to be in mechanical communication with an electromechanical switch 406 that is mounted to a PCB 408. The sound chamber 402 is a double horn cavity that is used to direct sound from a source (e.g., buzzer or speaker) to a couple of openings or sound windows in the housing of the barcode reader (see, for example, FIG. 2B). The sound windows are positioned to face a user's ears when the reader is in use. The horn shape directs the sound to the operator making the sound pressure level higher in that specific direction. In an embodiment, an increment in sound pressure level is +4 to +5 dBA measured at 50 cm from the source in a "fast" mode (e.g., 125 ms time window). It should be understood that alternative configurations may be utilized to provide for functionality that achieves the minimum volume specifications, as well.

Figure 4A:
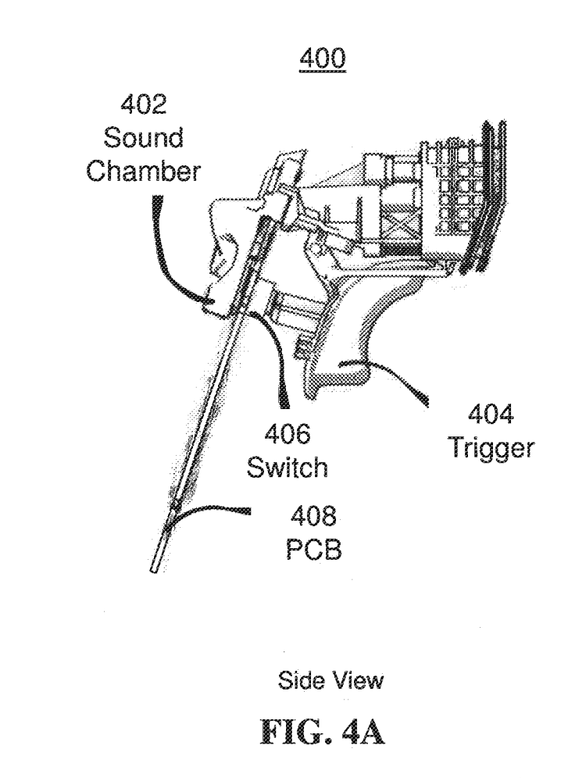
FIGS. 4A-4E are mechanical schematics of an illustrative handheld barcode reader showing an arrangement of an illustrative multi-function sound chamber, as described herein.
Figure 4B:
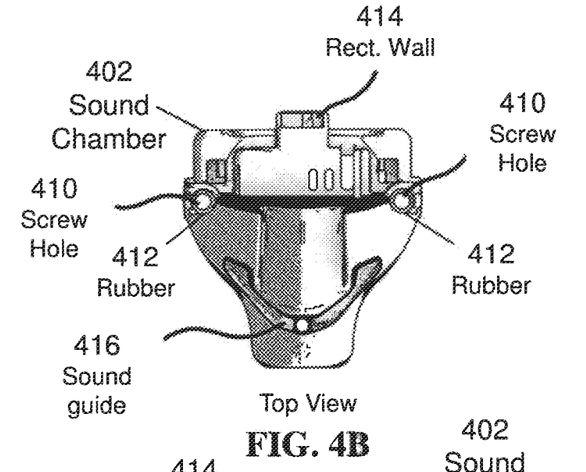

With regard to FIG. 4B, a top view of the sound chamber 402 is shown to include screw holes 410 that include rubber gaskets 412 disposed thereat to provide electrostatic discharge (ESD) protection, where the rubber gasket 412 may be capable of resisting upwards of 20 kV or more in the area. It should be understood that other materials that resist ESD may alternatively be utilized. To avoid light from good/bad read lights (e.g., LEDs) passing through a battery status window at the top of the reader (see, for example, FIG. 2B, window 216), a rectangular wall 414 may be used to shield a battery status light from exiting and good/bad read lights from entering. The wall 414 may be a single wall used to shield light or may be one of multiple walls (e.g., four walls) of a light guide used to shield and retain light therein. The use of the rectangular wall 414 may function to shield the read indictor light from exiting the battery status light window, and to shield the battery status light from exiting good/bad read windows of the reader.

Figure 4C:
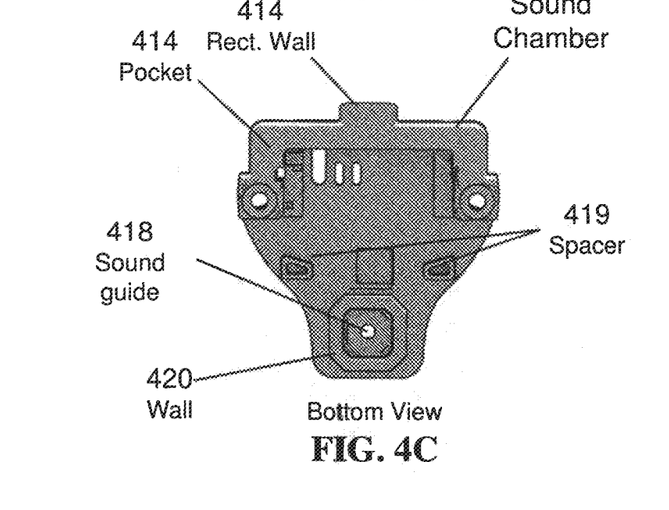

With regard to FIG. 4C, a bottom view of the sound chamber 402 showing a sound guide 418 and spacers 419. Ribs (not shown) may be included to strengthen a region around the spacers, as well. The sound guide 418 may be disposed within a wall or structure 420 that surrounds a sound generator, such as a buzzer mounted to a PCB (see FIG. 3A), to contain and direct an audible signal generated by the buzzer into the sound guide 418.

Figure 4D:
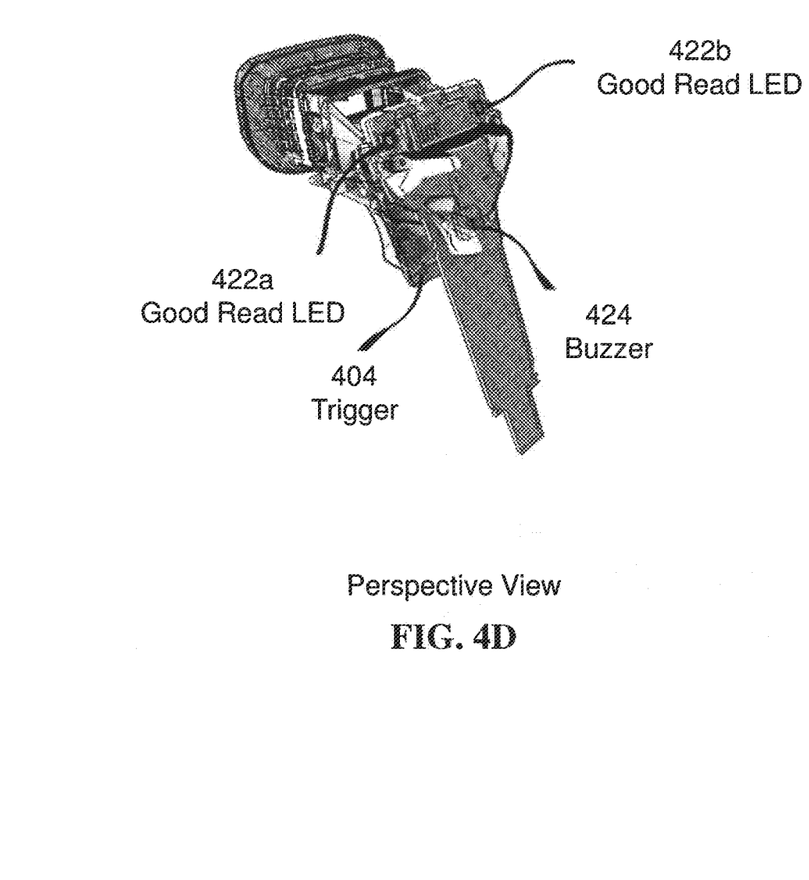

With regard to FIG. 4D, another schematic view of internal components of a handheld code scanner is shown to include a good/bad or successful/unsuccessful LEDs 422a and 422b, buzzer 424, and trigger 404. In response to a user pulling the trigger 404, the code scanner images, reads, and attempts to decode a machine-readable indicia. In response to successfully or unsuccessfully reading and decoding the machine-readable indicia, the successful/unsuccessful LEDs 422a and 422b may be illuminated in a corresponding color (e.g., green for good/successful, red for bad/unsuccessful). In addition, the buzzer 424 may be activated to output a first tone or sequence if successful (e.g., one buzz) or to output a second tone or sequence if unsuccessful (e.g., two buzzes).

Figure 4E:
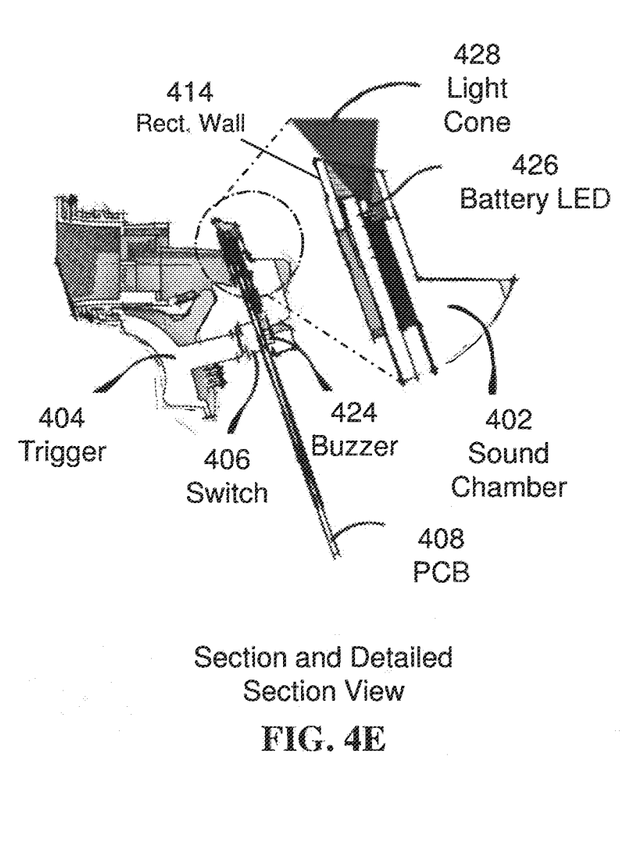

With regard to FIG. 4E, a section and detailed section view of the sound chamber 402 is shown to illustrate how a battery status LED 426 outputs an illumination signal or light cone 428 out of the sound chamber 402 via the rectangular wall 414. It should be understood that the rectangular wall 414 may have any other shape, and be capable of preventing light from entering and exiting, as previously described.

Figure 5:
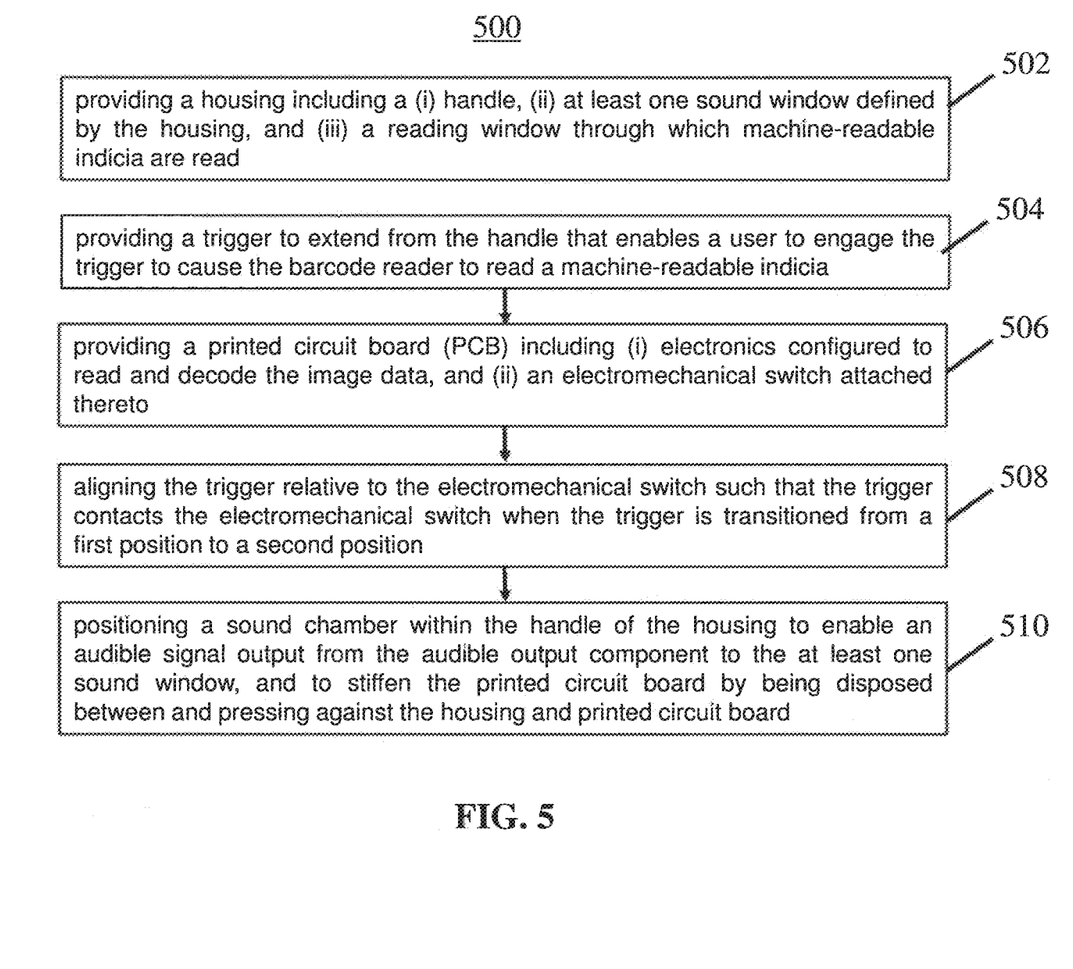
FIG. 5 is a flow diagram of an illustrative process for manufacturing a handheld barcode reader including a multi-function sound chamber.

With regard to FIG. 5, a flow diagram of an illustrative process 500 for manufacturing a handheld barcode reader including a multi-function sound chamber is shown. The process 500 may start at step 502, where a housing including a (i) handle, (ii) at least one sound window defined by the housing, and (iii) a reading window through which machine-readable indicia are read is provided. At step 504, a trigger may be provided that extends from the handle that enables a user to engage the trigger to cause the barcode reader to read a machine-readable indicia. At step 506, a printed circuit board (PCB) including (i) electronics configured to decode the image data, and (ii) an electromechanical switch attached thereto may be provided. The PCB 506 may also be configured to perform other functions of the code reader, such as power management, data communications, and so on. The trigger may be aligned relative to the electromechanical switch such that the trigger contacts the electromechanical switch when the trigger is transitioned from a first position to a second position at step 508. At step 510, a sound chamber may be positioned within the handle of the housing to guide an audible signal output from the audible output component to the at least one sound window, and to stiffen the printed circuit board by being disposed between and pressing against the housing and printed circuit board.

The process 500 may further include positioning the sound chamber within the housing by contacting the sound chamber directly against the housing and the printed circuit board. In an embodiment, the sound chamber may be positioned within the housing by positioning the sound chamber to align a first sound path with a first sound window, which may be to the left of a vertical centerline of the reader, defined by the housing and aligning a second sound path with a second sound window of the housing, which may be to the right of the vertical centerline of the reader.

The process 500 may further include extending the PCB vertically through a top portion (e.g., via a pocket defined by the top portion) of the sound chamber, where the top portion may be configured as a guide and support member for the PCB. The PCB may contact and be maintained with an elastic material (e.g., rubber) attached to an inside surface of the top portion of the sound chamber while the PCB is in an operational position. In an embodiment, screws or other connecting member may pass through cavities defined by the sound chamber, and seals (e.g., rubber seals) may be disposed around the cavities and screws to limit electrostatic discharge contained within the code reader. At least one light guide of the sound chamber may be aligned with at least one light window defined by the housing. The light guide(s) may be aligned with at least one light producing element (e.g., successful/unsuccessful status light) to cause light produced by the light producing element(s) to illuminate via the light guide(s) through the light window(s). At least one second light source (e.g., battery power level indicator light) may be aligned with at least one second light window to enable the second light producing element(s) to output light through the second light window(s).

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A handheld barcode reader, comprising:
a housing including a (i) handle, (ii) at least one sound window defined by the housing that faces a user of the reader when operating the reader, and (iii) a reading window through which machine-readable indicia are read;
an electronic reading device configured to image machine-readable indicia and to generate image data indicative of the machine-readable indicia;
a trigger extending from the handle that enables a user to engage the trigger to activate the electronic reading device to read a machine-readable indicia;
a printed circuit board (PCB) including (i) electronics configured to decode the image data, and (ii) an electromechanical switch attached thereto, the trigger being aligned relative to the electromechanical switch such that when the user transitions the trigger from a first position to a second position, the trigger contacts the electromechanical switch;
an audible output component in communication with the electronics, and configured to output an audible signal in response to the electronics successfully or unsuccessfully reading and decoding the machine-readable indicia; and
a sound chamber configured to be positioned within the handle of the housing, the sound chamber being configured to:
(i) propagate the audible signal from the audible output component to the at least one sound window; and
(ii) operate as a stiffening member for the printed circuit board by being disposed between and pressing against the housing and the printed circuit board,
wherein the sound chamber includes a first sound path that extends to a first sound window of the housing and a second sound path that extends to a second sound window of the housing.

2. The barcode reader according to claim 1, wherein pressing against the housing and the printed circuit board includes pressing directly against the housing and the printed circuit board.

3. The barcode reader according to claim 1, wherein the first sound window is disposed left of a vertical centerline of the reader when viewed from the rear and the second sound window is disposed right of the vertical centerline of the reader.

4. The barcode reader according to claim 1, wherein the sound chamber further defines cavities through which screws are inserted, and further comprising seals positioned around the cavities and screws when inserted therethrough.

5. A handheld barcode reader comprising:
a housing including a (i) handle, (ii) at least one sound window defined by the housing that faces a user of the reader when operating the reader, and (iii) a reading window through which machine-readable indicia are read;
an electronic reading device configured to image machine-readable indicia and to generate image data indicative of the machine-readable indicia;
a trigger extending from the handle that enables a user to engage the trigger to activate the electronic reading device to read a machine-readable indicia;
a printed circuit board (PCB) including (i) electronics configured to decode the image data, and (ii) an electromechanical switch attached thereto, the trigger being aligned relative to the electromechanical switch such that when the user transitions the trigger from a first position to a second position, the trigger contacts the electromechanical switch;
an audible output component in communication with the electronics, and configured to output an audible signal in response to the electronics successfully or unsuccessfully reading and decoding the machine-readable indicia; and
a sound chamber configured to be positioned within the handle of the housing, the sound chamber being configured to:
(i) propagate the audible signal from the audible output component to the at least one sound window; and
(ii) operate as a stiffening member for the printed circuit board by being disposed between and pressing against the housing and the printed circuit board,
wherein the sound chamber includes a top portion configured as a guide through which the PCB extends into and is supported when the PCB is positioned in an operational position.

6. The barcode reader according to claim 5, further comprising an elastic material attached to an inside surface of the top portion of the sound chamber so as to contact the PCB when positioned in the operational position.

7. A handheld barcode reader comprising:
a housing including a (i) handle, (ii) at least one sound window defined by the housing that faces a user of the reader when operating the reader, and (iii) a reading window through which machine-readable indicia are read;
an electronic reading device configured to image machine-readable indicia and to generate image data indicative of the machine-readable indicia;
a trigger extending from the handle that enables a user to engage the trigger to activate the electronic reading device to read a machine-readable indicia;
a printed circuit board (PCB) including (i) electronics configured to decode the image data, and (ii) an electromechanical switch attached thereto, the trigger being aligned relative to the electromechanical switch such that when the user transitions the trigger from a first position to a second position, the trigger contacts the electromechanical switch;
an audible output component in communication with the electronics, and configured to output an audible signal in response to the electronics successfully or unsuccessfully reading and decoding the machine-readable indicia; and
a sound chamber configured to be positioned within the handle of the housing, the sound chamber being configured to:
(i) propagate the audible signal from the audible output component to the at least one sound window; and (ii) operate as a stiffening member for the printed circuit board by being disposed between and pressing against the housing and the printed circuit board, wherein the housing further defines at least one light window, and wherein the sound chamber further defines at least one light guide.

8. The barcode reader according to claim 7, wherein the electronics are configured to read and determine whether the machine-readable indicia is successfully or unsuccessfully decoded, and further comprising at least one light producing element disposed in optical alignment with the at least one light guide, and wherein the electronics are further configured to cause the at least one light producing element to illuminate in a first color in response to determining that the decoding was successful and to illuminate in a second color in response to determining that the decoding was unsuccessful.

9. The barcode reader according to claim 7, wherein the housing further defines at least one second light window, and wherein the electronics includes a circuit configured (i) to measure battery voltage level, and (ii) to cause at least one second light producing element to generate a light color associated with a level of the measured battery voltage level.

10. A method of assembling a handheld barcode reader, the method comprising:
providing a housing including a (i) handle, (ii) at least one sound window defined by the housing, and (iii) a reading window through which machine-readable indicia are read;
providing a trigger to extend from the handle that enables a user to engage the trigger to cause the barcode reader to read a machine-readable indicia;
providing a printed circuit board (PCB) including (i) electronics configured to decode the image data, and (ii) an electromechanical switch attached thereto;
aligning the trigger relative to the electromechanical switch such that the trigger contacts the electromechanical switch when the trigger is transitioned from a first position to a second position;
positioning a sound chamber within the handle of the housing to enable an audible signal output from the audible output component to the at least one sound window, and to stiffen the printed circuit board by being disposed between and pressing against the housing and printed circuit board; and
extending the PCB vertically through a top portion of the sound chamber, the top portion being configured as a guide and support member for the PCB.

11. The method according to claim 10, wherein positioning the sound chamber within the housing includes contacting the sound chamber directly against the housing and the printed circuit board.

12. The method according to claim 10, wherein positioning the sound chamber within the housing includes positioning the sound chamber to align a first sound path with a first sound window of the housing and aligning a second sound path with a second sound window of the housing.

13. The method according to claim 12, wherein positioning the sound chamber within the housing includes aligning the first sound path with the first sound window disposed left of a vertical centerline of the reader when viewed from the rear and aligning the second sound window disposed right of the vertical centerline of the reader.

14. The method according to claim 10, further comprising contacting and maintaining the PCB with an elastic material attached to an inside surface of the top portion of the sound chamber while the PCB is in an operational position.

15. The method according to claim 10, further comprising inserting screws through cavities defined by the sound chamber, and further comprising positioning seals around the cavities and screws.

16. The method according to claim 10, further comprising aligning at least one light guide of the sound chamber with at least one light window defined by the housing.

17. The method according to claim 16, further comprising aligning the at least one light guide with at least one light producing element to cause light produced by the at least one light producing element to illuminate via the at least one light guide through the at least one light window.

18. The method according to claim 16, further comprising aligning at least one second light source with at least one second light window to enable the at least one second light producing element to output light through the at least one second light window.

19. A multi-function sound chamber, comprising:
a structure defining a sound guide, and dimensioned to fit within a space defined by:
(i) a housing of a handle and a reader head of a handheld barcode reader, the housing defining at least one sound window, and the sound guide aligned with the at least one sound window to guide sound generated by an audio signal generator to the at least one sound window,
(ii) a printed circuit board disposed (PCB) within the housing and vertically oriented within the handle with electronics mounted to the PCB facing forward or backward relative to a reading window of the handheld barcode reader, the dimensions of the structure causing the structure to press against an inside surface of the housing and a surface of the PCB such that the PCB is pushed forward; and
at least one first light guide through which light is propagated to enable light to be illuminated via a first light window of the barcode reader.

20. The multi-function sound chamber according to claim 19, wherein the structure includes silicon rubber material disposed on an outside surface such that the silicon rubber material presses against the inside surface of the housing.

21. The multi-function sound chamber according to claim 19, wherein the sound guide is a double horn sound guide.

22. The multi-function sound chamber according to claim 19, wherein the structure includes a top portion configured as a pocket through which the PCB is positioned in an operational position.

23. The multi-function sound chamber according to claim 19, wherein the structure further defines cavities through which screws are inserted, and further comprising seals that limit electrostatic discharge positioned around the cavities and screws when inserted therethrough.

24. The multi-function sound chamber according to claim 19, wherein the structure further defines at least one second light guide through which light is propagated to enable light to be illuminated via a second light window of the barcode reader, the at least one second light guide preventing light from the at least one first light guide to exit from the second light window.

25. The multi-function sound chamber of claim 24, wherein the light illuminated via the second light window is indicative of an amount of power remaining in a battery within a code reader including the structure.

26. The multi-function sound chamber of claim 19, wherein the at least one sound window includes a plurality of sound windows.

27. The multi-function sound chamber of claim 19, wherein the light illuminated via the first light window is indicative of a code reader including the structure either successfully or unsuccessfully decoding a machine readable indicia.

\* \* \* \* \*